(12) United States Patent
Maenosono et al.

(10) Patent No.: US 11,827,502 B2
(45) Date of Patent: Nov. 28, 2023

(54) CONVEYANCE DEVICE

(71) Applicant: MAKINO J CO., LTD., Kanagawa (JP)

(72) Inventors: Takudai Maenosono, Kanagawa (JP); Masahiro Sasaki, Kanagawa (JP); Noboru Murakami, Kanagawa (JP)

(73) Assignee: MAKINO J CO., LTD., Kanagawa (JP)

( * ) Notice: Subject to any disclaimer, the term of this patent is extended or adjusted under 35 U.S.C. 154(b) by 88 days.

(21) Appl. No.: 17/606,512

(22) PCT Filed: Feb. 20, 2020

(86) PCT No.: PCT/JP2020/006908
§ 371 (c)(1),
(2) Date: Oct. 26, 2021

(87) PCT Pub. No.: WO2020/217681
PCT Pub. Date: Oct. 29, 2020

(65) Prior Publication Data
US 2022/0204330 A1     Jun. 30, 2022

(30) Foreign Application Priority Data

Apr. 26, 2019 (JP) .................................. 2019-086805

(51) Int. Cl.
*B66F 9/14* (2006.01)
*B65G 1/04* (2006.01)
*B66F 9/08* (2006.01)

(52) U.S. Cl.
CPC ............. *B66F 9/14* (2013.01); *B65G 1/0407* (2013.01); *B66F 9/08* (2013.01)

(58) Field of Classification Search
CPC ............. B66F 9/14; B66F 9/08; B65G 1/0407
See application file for complete search history.

(56) References Cited

U.S. PATENT DOCUMENTS

| 3,734,310 A * | 5/1973 | Miller .................. B65G 1/0421 414/273 |
| 8,690,509 B2 * | 4/2014 | Tsujimoto ............ B65G 1/0407 414/940 |

(Continued)

FOREIGN PATENT DOCUMENTS

| JP | S50-35514 Y | 10/1975 |
| JP | H6-10212 U | 2/1994 |

(Continued)

OTHER PUBLICATIONS

International Search Report for PCT/JP2020/006908 (dated Mar. 31, 2020).

*Primary Examiner* — Michael A Riegelman
(74) *Attorney, Agent, or Firm* — Merchant & Gould P.C.

(57) ABSTRACT

A conveyance device (100) comprises: a carriage (10); a support column (20); a lifting device (30) that moves in the vertical direction along the support column (20); and a load platform (90) that is moved in the vertical direction by the lifting device (30). The lifting device (30) includes an upper guide (40), a lower guide (50), and a linking member (60) for linking an upper member (41) and a lower member (51) together. The upper guide (40) includes: a first wheel (42) that rolls on a rear surface (22) of the support column (20); and the upper member (41) which supports the first wheel (42). The lower guide (50) includes: a second wheel (52) that rolls on a front surface (21) of the support column (20); and the lower member (51) which supports the second wheel (52), the lower guide being disposed below the upper guide (40). The load platform (90) is disposed in front of the second wheel (52), and is linked to front side and rear side portions of the linking member (60).

6 Claims, 7 Drawing Sheets

(56) References Cited

U.S. PATENT DOCUMENTS

| | | | | |
|---|---|---|---|---|
| 2009/0028675 | A1* | 1/2009 | Tsujimoto | B65G 1/0407 |
| | | | | 414/273 |
| 2009/0162176 | A1* | 6/2009 | Link | B65G 1/0421 |
| | | | | 414/659 |
| 2015/0353281 | A1* | 12/2015 | Tanaka | B66F 9/072 |
| | | | | 187/240 |
| 2019/0241415 | A1* | 8/2019 | Tanaka | B65G 1/023 |
| 2022/0089420 | A1* | 3/2022 | Faimali | B66F 9/143 |
| 2022/0204330 | A1* | 6/2022 | Maenosono | B66F 9/14 |
| 2022/0212866 | A1* | 7/2022 | Murakami | B65G 1/0435 |

FOREIGN PATENT DOCUMENTS

| | | |
|---|---|---|
| JP | S52-61875 U | 5/1997 |
| JP | 2004-299868 A | 10/2004 |
| JP | 2009-120273 A | 6/2009 |
| JP | 2009-190855 A | 8/2009 |

* cited by examiner

CONVEYANCE DEVICE

This application is a National Stage Application of PCT/JP2020/006908, filed Feb. 20, 2020, which claims benefit of priority to Japanese Patent Application No. 2019-086805, filed Apr. 26, 2019, which applications are incorporated herein by reference. To the extent appropriate, a claim of priority is made to each of the above disclosed applications.

FIELD

The present invention relates to a conveyance device.

BACKGROUND

Conveyance devices for carrying products such as workpieces or packages are conventionally known. For example, Patent Literature 1 discloses a stacker crane for carrying packages in a warehouse. This stacker crane comprises a lower frame which moves along rails on the floor, a support column which protrudes upwardly from the lower frame, an upper frame which is installed at the top of the support column and which moves along a ceiling guide rail, and a loading platform which moves upward and downward along the support column. The loading platform has a pair of guide rollers, and the support column is provided with a pair of inwardly-facing tracks which face each other. The guide rollers of the loading platform are arranged inside the support column so as to roll on the tracks of the support column.

CITATION LIST

Patent Literature

[PTL 1] Japanese Examined Utility Model Publication No. 50-35514

SUMMARY

Technical Problem

In the conveyance device of Patent Literature 1, since it is necessary that the guide rollers of the loading platform be arranged inside the support column, as described above, the structure is complex and it is difficult to access the guide rollers during assembly and maintenance, etc.

The present invention aims to provide a conveyance device having suitable maintainability with a simple structure.

Solution to Problem

One aspect of the present disclosure provides a conveyance device for carrying a product, the conveyance device comprising (i) a carriage which travels in horizontal forward and rearward directions, (ii) a support column which protrudes upwardly from the carriage, (iii) a lifting device which moves in the upward and downward direction along the support column and comprises an upper guide having a first wheel which rolls on a rear surface of the support column and an upper member which supports the first wheel, a lower guide, arranged below the upper guide, having a second wheel which rolls on a front surface of the support column and a lower member which supports the second wheel, and a linking member which links the upper member and the lower member to each other, and (iv) a loading platform which is moved in the upward and downward direction by the lifting device, which is arranged in front of the second wheel, and which is linked to a front side of the linking member.

In the conveyance device according to the aspect of the present disclosure, the first wheel and second wheel of the lifting device are arranged so as to roll on the rear surface and the front surface of the support column, respectively. Thus, the first wheel and the second wheel are arranged outside of the support column, and thus, the structure can be simplified, and the accessibility of the first wheel and the second wheel can be improved. Therefore, a conveyance device having suitable maintainability with a simple structure can be provided.

The support column may be a square column having the front surface, the rear surface, and left and right surfaces, the upper guide may have a pair of third wheels which roll on the left and right surfaces of the support column, the upper member may comprise an upper main member which is arranged behind the support column and which supports the first wheel, and a pair of upper auxiliary members which protrude forwardly from the upper main member so as to face each other with the support column interposed therebetween, and which support the pair of third wheels, the upper member may be open toward the front, the lower guide may have a pair of fourth wheels which roll on the left and right surfaces of the support column, the lower member may comprise a lower main member which is arranged in front of the support column and which supports the second wheel, and a pair of lower auxiliary members which protrude rearwardly from the lower main member so as to face each other with the support column interposed therebetween, and which support the pair of fourth wheels, the lower member may be open toward the rear, and the linking member, in a side view, may extend diagonally and linearly so as to link the upper main member and the lower main member. In this case, in a right-side view, a substantially Z-shaped structure is obtained by means of the upper member, the lower member, and the linking member. In this Z-shaped structure, since the upper main member supporting the first wheel and the lower main member supporting the second wheel are diagonally and linearly linked by the linking member, the weight of the loading platform and product in front of the second wheel can be transmitted to the upper rear first wheel by the shortest distance. Thus, the force can be efficiently distributed to the lower front second wheel and the upper rear first wheel. Furthermore, the third and fourth wheels can improve the stability in the left-right directions. As described above, both the distribution of the force in the front-rear directions and stability in the left-right directions can be efficiently achieved by the Z-shaped structure, as described above.

The lifting device may be driven by a gear which is rotated by a motor affixed to the lifting device and a linear guide member which is affixed to the rear surface of the support column and which meshes with the gear. In this case, since the linear guide member is affixed to the rear surface of the support column, a compact structure as compared with a lifting device driven using a moving member such as a chain can be obtained.

The conveyance device may further comprise a safety device which detects inclination of the lifting device when an upward force is exerted on the loading platform. In the conveyance device according to the aspect of the present disclosure, when an upward force is exerted on the loading platform, a moment is generated in the direction in which the first wheel and the second wheel are separated from the support column. Thus, by detecting inclination of the lifting device due to such a moment, safety can be improved.

The conveyance may further comprise an adjustment mechanism for adjusting at least one of a position of the first wheel with respect to the upper member and a position of the second wheel with respect to the lower member. The first wheel and the second wheel may wear with use. As the first wheel and second wheel wear, the posture of the lifting device with respect to the support column changes, which can cause the lifting device to incline. In order to maintain a constant posture of the lifting device with respect to the support column, at least one of the position of the first wheel with respect to the upper member and the position of the second wheel with respect to the lower member must be adjusted. In the present aspect, the adjustment mechanism enables adjustment of at least one thereof. Thus, a constant posture of the lifting device with respect to the support column can be maintained over the long term.

The conveyance device may further comprise a reinforcing member which links the carriage and the rear surface of the support column. In the aspect described above, in which the lower guide of the lifting device opens rearwardly, even if such a reinforcing member is provided on the rear surface of the support column, the lifting device and the reinforcing member do not interfere with each other. Thus, the strength of the conveyance device can be improved.

Advantageous Effects of Invention

According to the aspect of the present disclosure, a conveyance device having suitable maintainability with a simple structure can be provided.

DESCRIPTION OF EMBODIMENTS

The conveyance device according to an embodiment will be described below with reference to the attached drawings. Identical or corresponding elements have been assigned the same reference sign, and duplicate descriptions thereof have been omitted. In order to facilitate understanding, the scales of the drawings have been modified in some cases.

Figure 1:
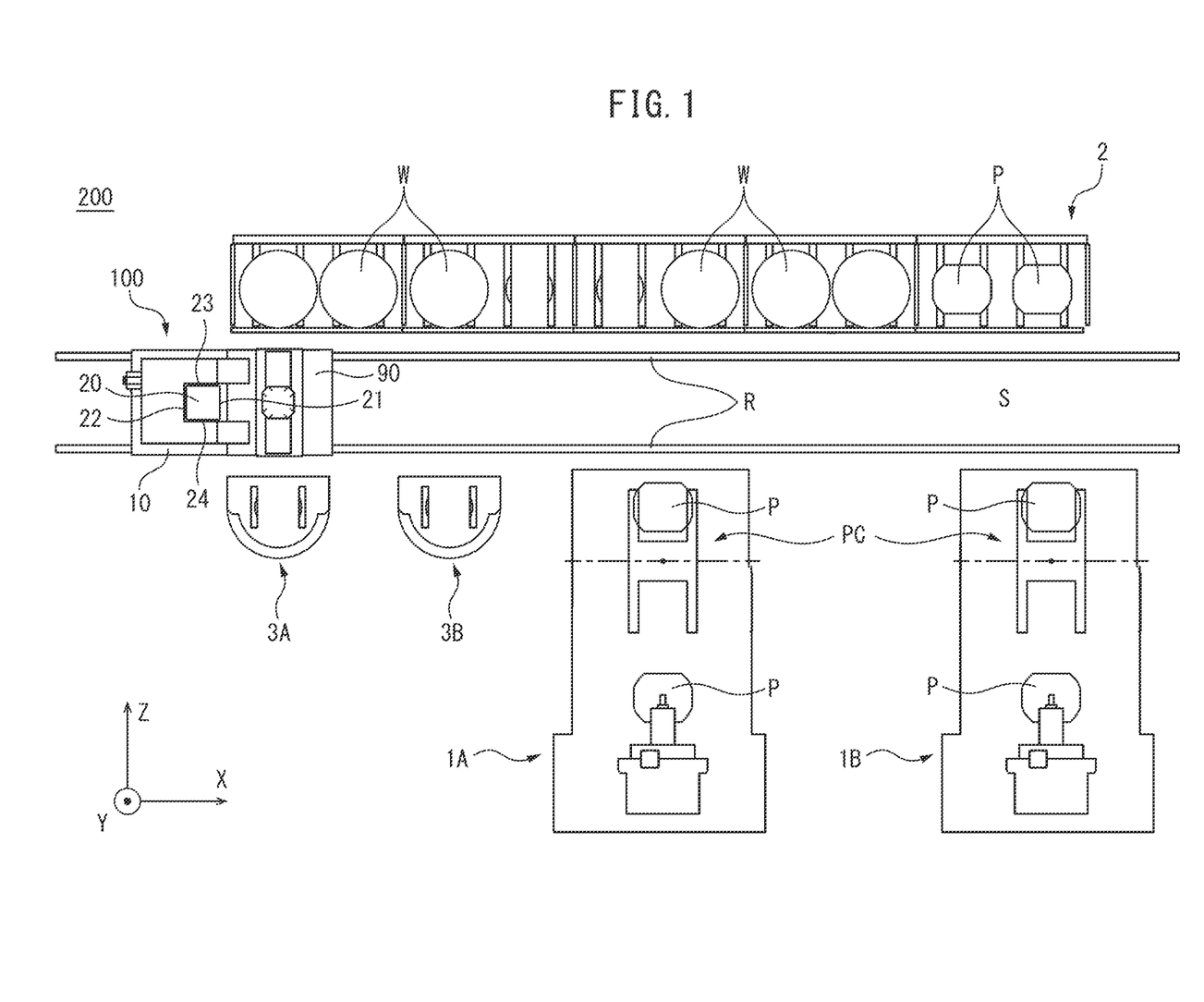
FIG. 1 is a top view showing a system comprising a conveyance device according to an embodiment.
Figure 2:
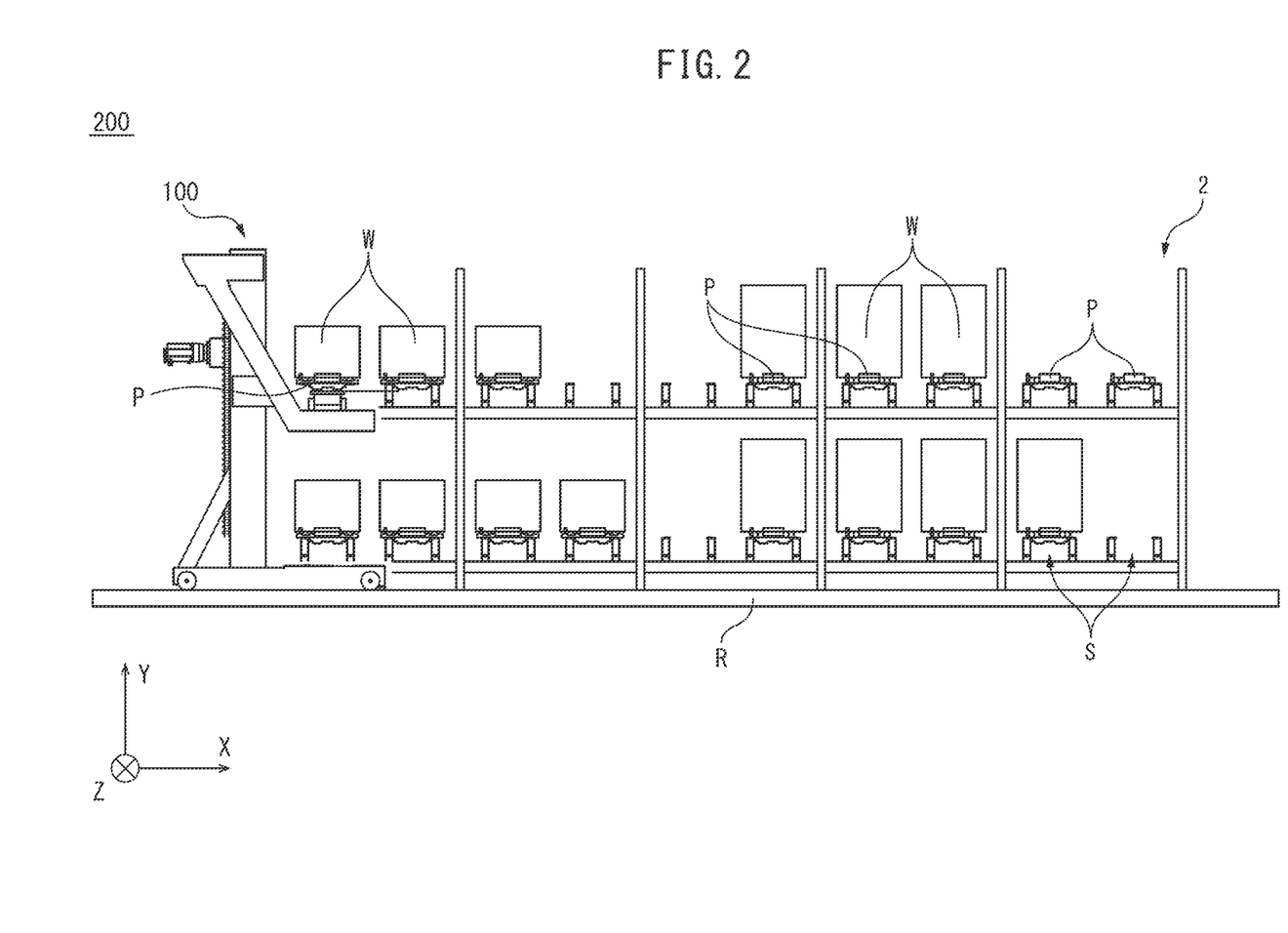
FIG. 2 is a side view showing the system of FIG. 1.

FIG. 1 is a top view showing a system 200 comprising a conveyance device 100 according to an embodiment, and FIG. 2 is a side view showing the system 200 of FIG. 1. Referring to FIG. 1, the conveyance device 100 can travel between a plurality of locations along rails R, and can carry various products. For example, in the present embodiment, the conveyance device 100 is used in a factory for machining workpieces W. Specifically, in the system 200, the conveyance device 100 conveys workpieces W between processing machines 1A, 1B, a pallet stocker (shelf) 2, and workpiece setup stations (WSS, hereinafter referred to simply as "stations") 3A, 3B. Referring to FIG. 2, the workpieces W may be attached to, for example, pallets P and the pallets P may be carried by the conveyance device 100. In another embodiment, the workpieces W may be carried directly by the conveyance device 100. Furthermore, in another embodiment, the conveyance device 100 may carry other products. For example, the conveyance device 100 may carry packages between a plurality of shelves in a warehouse. Note that in FIG. 2, to facilitate understanding, the processing machines 1A, 1B and the stations 3A, 3B are not shown.

Referring to FIG. 1, the processing machines 1A, 1B can be any of various machine tools such as machining centers. For example, each of the processing machines 1A, 1B comprises a pallet changer PC which is capable of exchanging a pallet P having a non-machined workpiece W with a pallet P having a machined workpiece W. In the stations 3A, 3B, an operator can attach a workpiece W to a pallet P and can remove a workpiece W from a pallet P. Referring to FIG. 2, the pallet stocker 2 can house pallets P with or without a workpiece W. The pallet stocker 2 has a plurality of stock areas S for housing pallets P (2 rows×10 columns in FIG. 2). The conveyance device 100, processing machines 1A, 1B, and stations 3A, 3B may comprise individual controllers (local controllers), and the system 200 may comprise a controller (main controller) which is capable of communicating with these local controllers.

Figure 3:
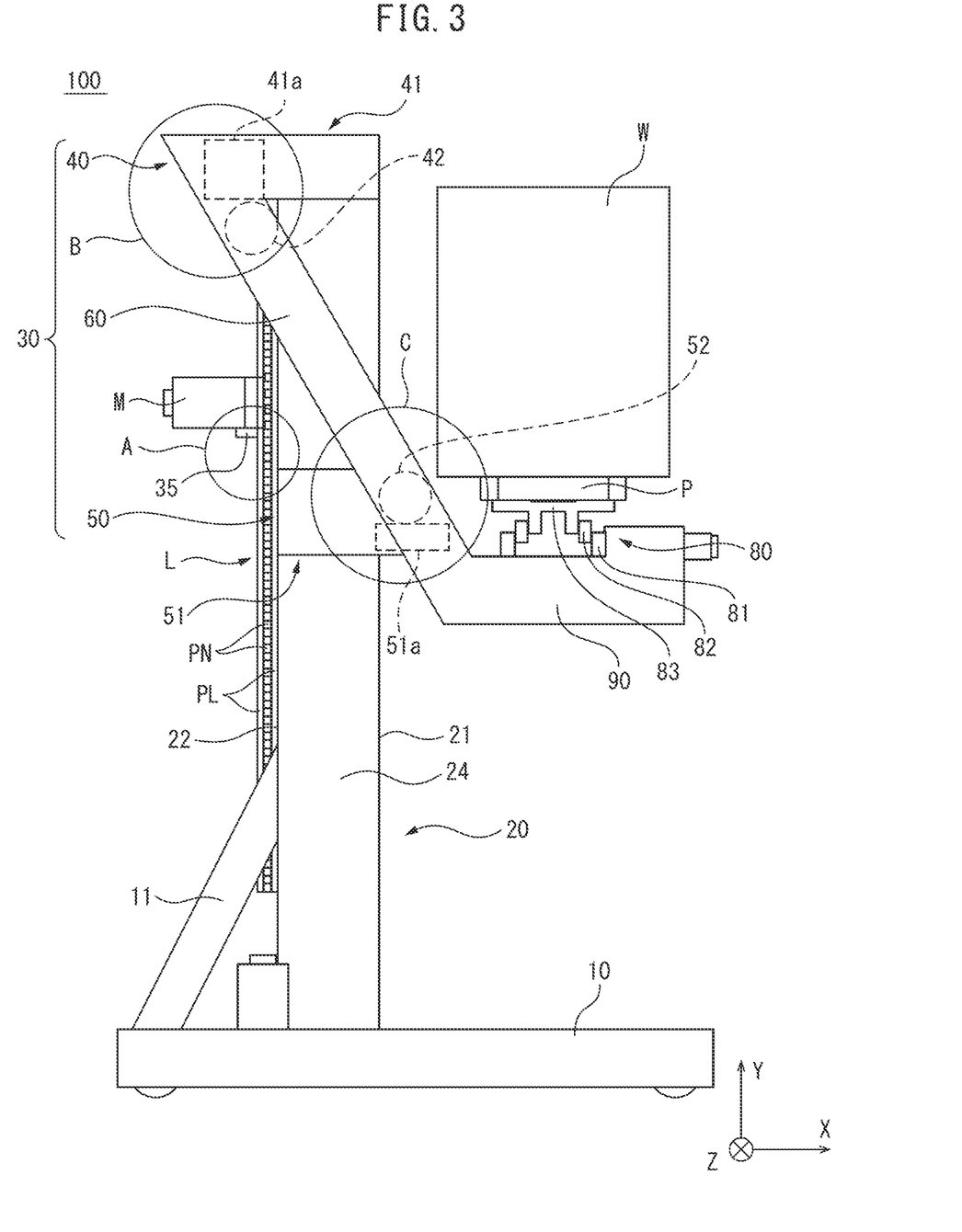
FIG. 3 is a side view showing the conveyance device of FIG. 1.
Figure 4:
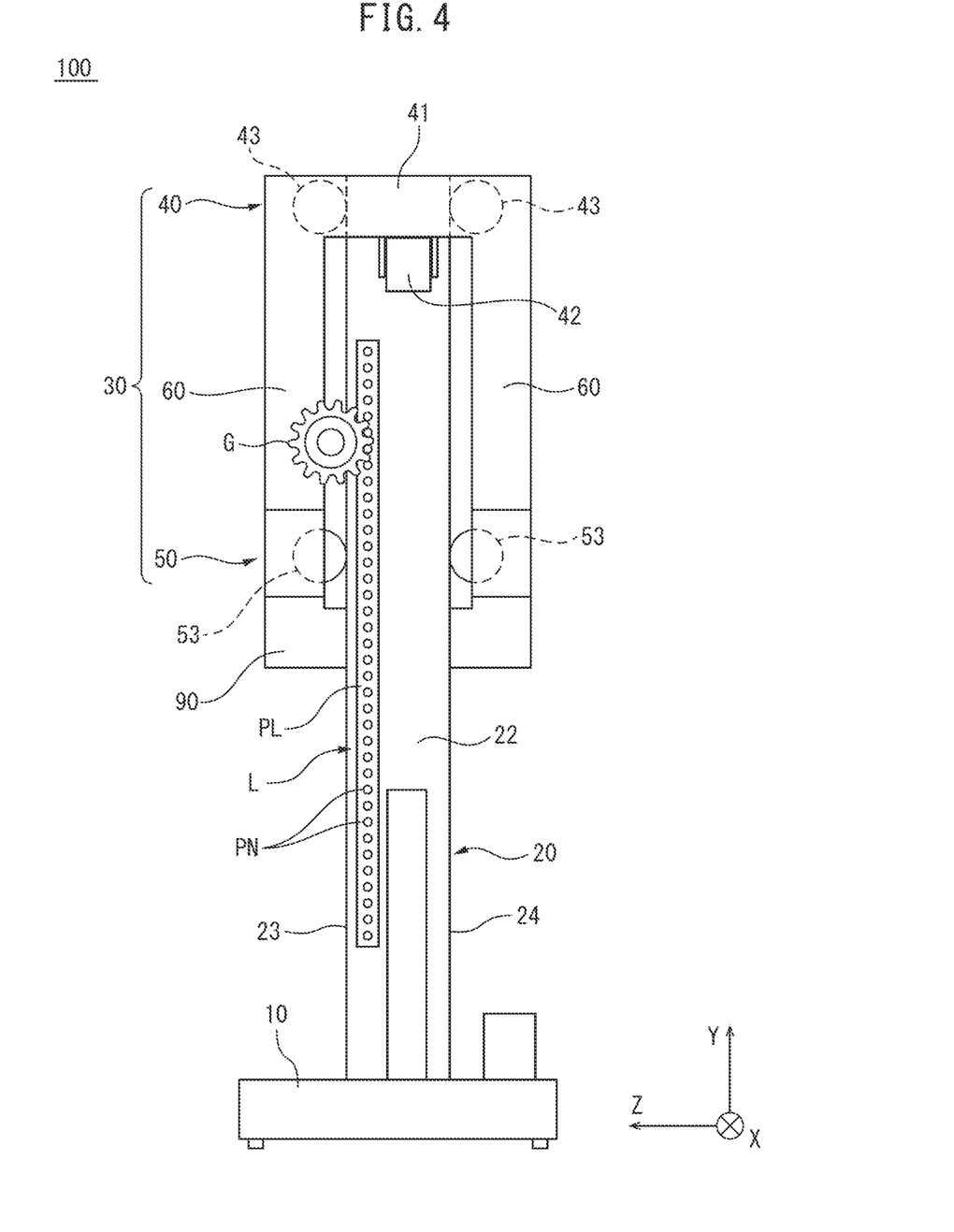
FIG. 4 is a rear view showing the conveyance device of FIG. 1.

FIG. 3 is a side view showing the conveyance device 100 of FIG. 1, and FIG. 4 is a rear view showing the conveyance device 100 of FIG. 1. Referring to FIG. 3, the conveyance device 100 comprises a carriage 10, a support column 20, a lifting device 30, and a loading platform 90. The conveyance device 100 may further comprise other constituent elements (for example, a controller).

Referring to FIG. 1, the carriage 10 is configured so as to travel horizontally along the rails R. In the present embodiment, the carriage 10 travels along two rails R. In another embodiment, the carriage 10 may travel along a single rail R. The travelling of the carriage 10 may be controlled by the local controller of the conveyance device 100 described above.

Regarding the coordinate axes with respect to the conveyance device 100, the axis parallel to the direction in which the carriage 10 moves (also referred to as the "forward-rearward directions") is the X-axis (also referred to as the "travel axis"). With respect to the support column 20, the side on which the loading platform 90 is present is the "front", and the side opposite thereto is the "rear." Among horizontal directions, the direction orthogonal to the front-rear direction is the left-right direction, and the axis parallel to the left-right direction (i.e., the horizontal axis orthogonal to the X-axis) is the Z-axis (also referred to as the "transfer axis"). The axis parallel to the vertical direction (also referred to as the "up-down directions") is the Y-axis (also referred to as the "elevation axis").

The support column 20 protrudes vertically upward from the carriage 10. The support column 20 is a square column, and has a front surface 21, a rear surface 22, a right surface 23, and a left surface 24. Referring to FIG. 3, the conveyance device 100 comprises a reinforcing member 11 which links the carriage 10 and the rear surface 22 of the support column 20. In the conveyance 100, a lower member 51 of the lifting device 30, which will be described in detail later, is open rearwardly, and thus, when the lifting device 30 moves downwardly, the reinforcing member 11 does not interfere with the lifting device 30.

The lifting device 30 moves in the up-down directions along the support column 20. The lifting device 30 has an upper guide 40, a lower guide 50, and a pair of linking members 60. The upper guide 40 constitutes an upper part of the lifting device 30, and has an upper member 41 and a first wheel 42. Furthermore, referring to FIG. 4, the upper guide 40 has a pair of third wheels 43.

Figure 6:
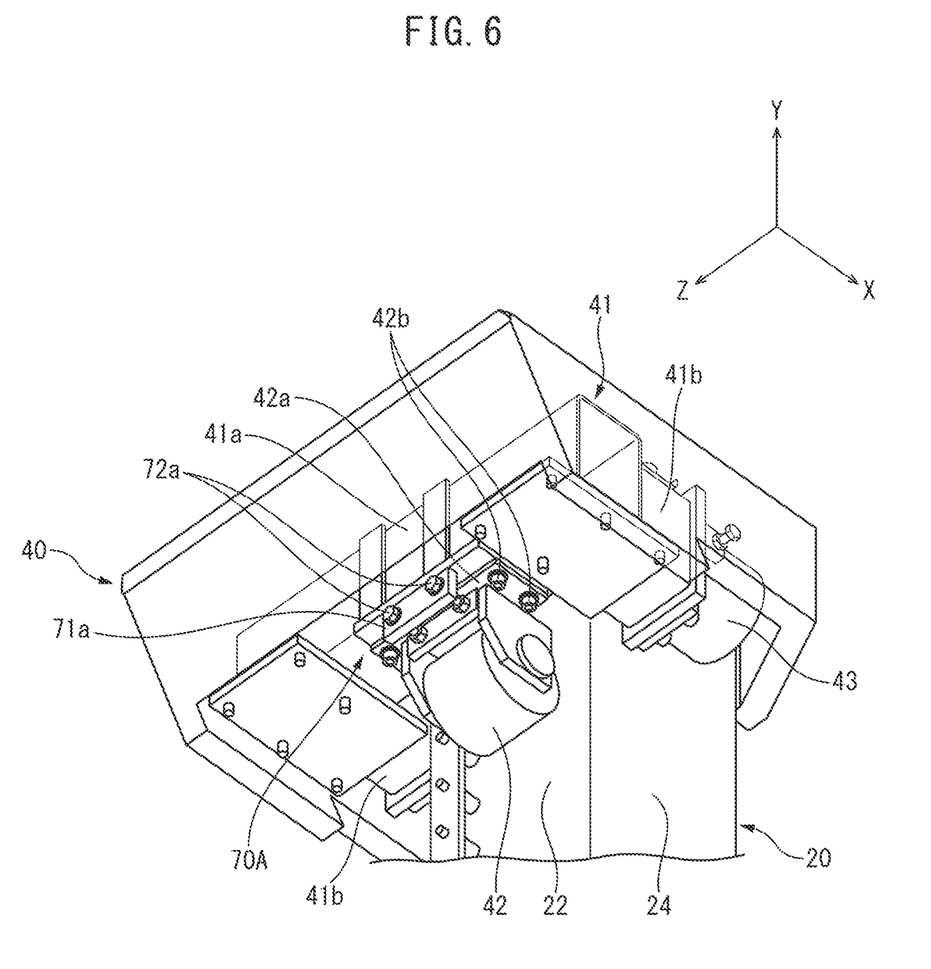
FIG. 6 is an enlarged perspective view showing portion B of FIG. 3.

FIG. 6 is an enlarged perspective view showing portion B of FIG. 3, and shows the upper guide 40 as viewed from below and behind. Note that in FIG. 6, several constituent elements such as the linking members 60 are not shown. The upper member 41 is substantially U-shaped opening forwardly in a bottom view (or top view). Specifically, the upper member 41 includes an upper main member 41a and a pair of upper auxiliary members 41b.

The upper main member 41a is arranged behind the support column 20 and extends along the left-right directions (Z-axis). The upper main member 41a supports the first wheel 42. Specifically, the first wheel 42 is attached to the bottom surface of the upper main member 41a so as to roll along the rear surface 22 of the support column 20 in contact with the rear surface 22.

The pair of upper auxiliary members 41b protrude frontward along the X-axis from the vicinity of both ends of the upper main member 41a so as to face each other with the support column 20 interposed therebetween. The upper auxiliary members 41b support the third wheels 43. Specifically, one third wheel 43 is attached to the front surface of one upper auxiliary member 41b so as to roll on the left surface 24 of the support column 20 in contact with the left surface 24. Likewise, though not shown in FIG. 6, the other third wheel 43 is attached to the front surface of the other upper auxiliary member 41b so as to roll on the right surface 23 of the support column 20 in contact with the right surface 23.

The conveyance device 100 comprises a first adjustment mechanism 70A for adjusting the position of the first wheel 42. Specifically, the first adjustment mechanism 70A has a bracket 71a which is affixed to the upper main member 41a and machine bolts 72a. Furthermore, for example, an affixation part 42a of the first wheel 42 can be affixed to the upper main member 41a by bolts 42b in slots provided in the affixation part 42a. When the first wheel 42 becomes worn, the position of the first wheel 42 with respect to the upper member 41 can be adjusted along the slots by loosening the bolts 42b and tightening the machine bolts 72a. Once the position has been adjusted, the bolts 42b can be tightened.

Referring to FIG. 3, the lower guide 50 constitutes a lower part of the lifting device 30, and is arranged below the upper guide 40. The lower guide 50 has a lower member 51 and a second wheel 52. Furthermore, referring to FIG. 4, the lower guide 50 has a pair of fourth wheels 53.

Figure 7:
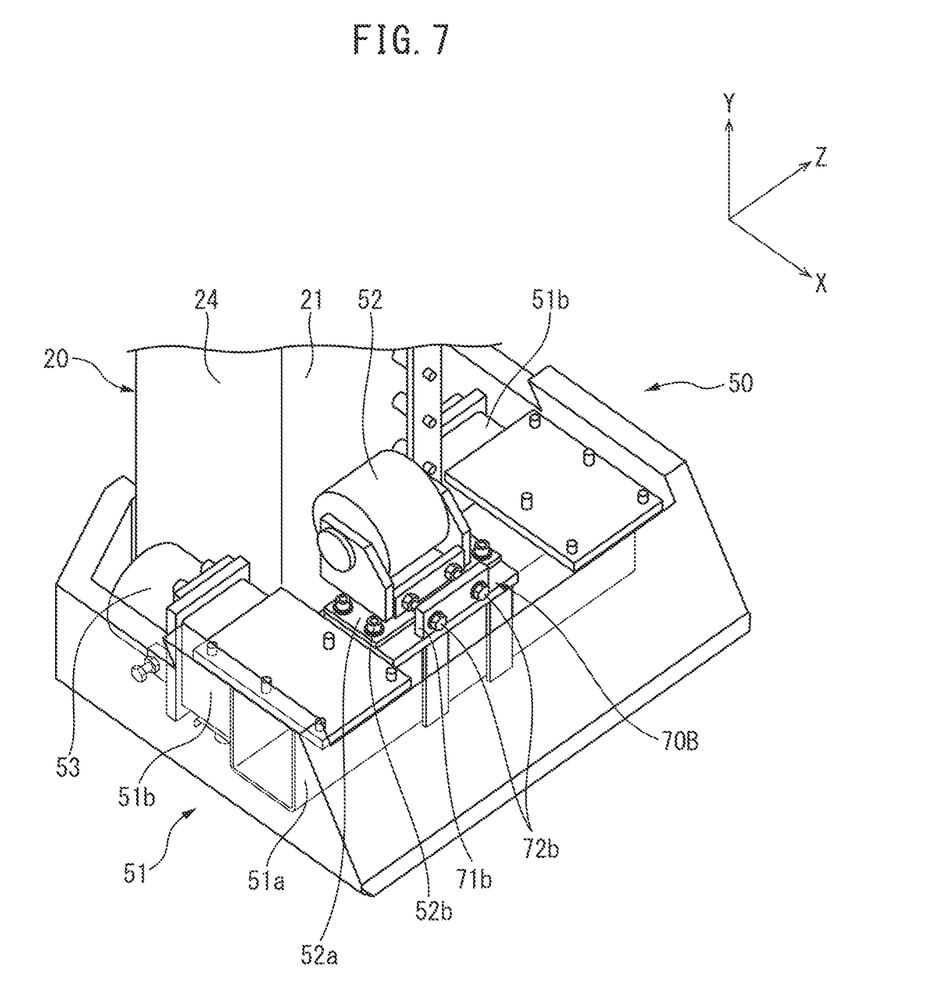
FIG. 7 is an enlarged perspective view showing portion C of FIG. 3.

FIG. 7 is an enlarged perspective view showing portion C of FIG. 3, and shows the lower guide 50 as viewed from above and in front. Note that in FIG. 7, several constituent elements such as the linking member 60 are not shown. The lower member 51 is substantially U-shaped opening to the rear in a top view (or bottom view). Specifically, the lower member 51 has a lower main member 51a and a pair of lower auxiliary members 51b.

The lower main member 51a is arranged in front of the support column 20 and extends along the left-right directions (Z-axis). The lower main member 51a supports the second wheel 52. Specifically, the second wheel 52 is attached to the upper surface of the lower main member 51a so as to roll on the front surface 21 of the support column 20 in contact with the front surface 21.

The pair of lower auxiliary members 51b protrude rearward along the X-axis from the vicinity of both ends of the lower main member 51a so as to face each other with the support column 20 interposed therebetween. The lower auxiliary members 51b support the fourth wheels 53. Specifically, one fourth wheel 53 is attached to the rear surface of one lower auxiliary member 51b so as to roll on the left surface 24 of the support column 20 in contact with the left surface 24. Though not illustrated in FIG. 7, likewise, the other fourth wheel 53 is attached to the rear surface of the other lower auxiliary member 51b so as to roll on the right surface 23 of the support column 20 in contact therewith.

The conveyance device 100 comprises a second adjustment mechanism 70B for adjusting the position of the second wheel 52. Specifically, the second adjustment mechanism 70B has a bracket 71b affixed to the lower main member 51a and machine bolts 72b. Furthermore, for example, an affixation part 52a of the second wheel 52 can be affixed to the lower main member 51a by bolts 52b in slots provided in the affixation part 52a. When the second wheel 52 becomes worn, the position of the second wheel 52 can be adjusted with respect to the lower member 51 along the slots by loosening the bolts 52b and tightening the machine bolts 72b. Once the position has been adjusted, the bolts 52b can be tightened.

Referring to FIG. 3, the linking members 60 link the upper member 41 and the lower member 51 to each other. Specifically, the linking members 60 extend diagonally and linearly so as to link the upper main member 41a and the lower main member 51a in a side view. From another point of view, the linking members 60 extend diagonally and linearly so as to pass through (overlap) the first wheel 42 and the second wheel 52 in the side view. The pair of linking members 60 link the left and right ends of the upper main member 41a to the left and right ends of the lower main member 51a, respectively.

As shown in FIG. 3, the lifting device 30 has a substantially inverted Z-shaped structure in a left side view (i.e., substantially Z-shaped in a right-side view) formed by the upper member 41, the linking members 60, and the lower member 51, as described above. Due to this Z-shaped structure, the weight of the loading platform 90 and the workpiece W can be distributed to the upper rear first wheel 42 and the lower front second wheel 52 by the shortest distance by the linear linking members 60, and the lifting device 30 can be stabilized in the left-right directions by the third and fourth wheels 43, 53.

Referring to FIGS. 3 and 4, the lifting device 30 is driven by a gear G which is rotated by a motor M affixed to the lifting device 30 and a linear guide member L which is affixed to the rear surface 22 of the support column 20 and which meshes with the gear G. Note that in FIG. 4, in order to facilitate understanding, several constituent elements such as the motor M are not shown. For example, the motor M can be a servomotor, and can be affixed to a constituent element of the lifting device 30 (for example, the linking members 60, etc.). The linear guide member L can have a plurality of pins PN arranged in a straight line and a pair of plates PL for supporting the plurality of pins PN therebetween. Alternatively, the linear guide member L may be, for example, a rack comprising a plurality of teeth. The rotation of the motor M (i.e., the height of the lifting device 30 and the loading platform 90) can be controlled by, for example, the local controller of the conveyance device 100.

Referring to FIG. 3, the conveyance device 100 comprises a safety device 35 which detects inclination of the lifting device 30 when an upward force is exerted on the loading platform 90. For example, the safety device 35 can be affixed to a constituent element (for example, below the motor M, etc.) of the lifting device 30.

Figure 5:
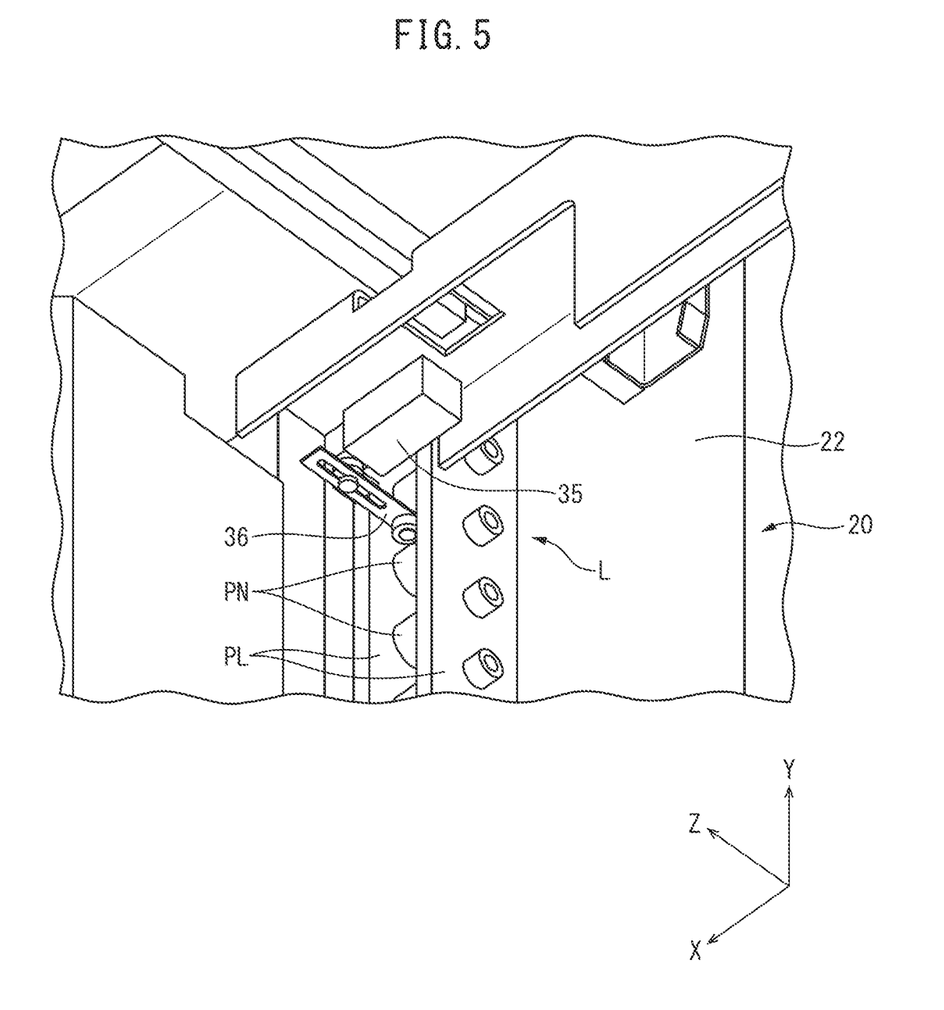
FIG. 5 is an enlarged perspective view showing portion A of FIG. 3.

FIG. 5 is an enlarged perspective view showing section A of FIG. 3, and shows the safety device 35 as viewed from below and behind. The safety device 35 can be, for example, a limit switch which detects rotation, or can include a rotation lever 36. Normally, the tip of the rotation lever 36 is slightly separated from the plates PL affixed to, for example, the rear surface 22 of the support column 20.

Referring to FIG. 3, when an upward force is exerted on the loading platform 90 (for example, when the bottom surface of the loading platform 90 collides with the pallet stocker 2), since the lifting device 30 has a Z-shaped structure as described above, a moment is generated in the direction in which the first wheel 42 and the second wheel 52 are separated from the support column 20, and the lifting device 30 is slightly inclined counterclockwise in FIG. 3. With reference to FIG. 5, due to this inclination, the tip of the rotation lever 36 comes into contact with the plate PL, and the safety device 35 detects inclination of the lifting device 30. For example, the safety device 35 can communicate with the local controller of the conveyance device 100. When the local controller receives a signal from the safety device 35 indicating that inclination of the lifting device 30 has been detected, the local controller may execute a predetermined measure (for example, stopping the movement of the conveyance device 100 or notifying that inclination has been detected). Note that the safety device 35 can have any of various configurations as long as it is capable of detecting inclination of the lifting device 30, and is not limited to the above configuration.

Referring to FIG. 3, the loading platform 90 is moved in the up-down directions by the lifting device 30. The loading platform 90 is arranged in front of the second wheel 52 and is connected to the front lower sides of the linking members 60. A slide device 80 for moving the product left and right along the Z-axis is provided on the loading platform 90. The slide device 80 comprises a base member 81, an intermediate member 82, and a workpiece holding part 83. The base member 81 is affixed to the loading platform 90. The intermediate member 82 is configured so as to move left and right on the base member 81, and the workpiece holding part 83 is configured so as to move left and right on the intermediate member 82. The workpiece holding part 83 is configured so as to hold a pallet P. Due to this configuration, the workpiece holding part 83 can move the pallet P left and right along the Z-axis, and can convey the pallet P between the processing machines 1A, 1B, the pallet stocker 2, and the stations 3A, 3B (refer to FIG. 1). The intermediate member 82 and the workpiece holding part 83 can be driven by, for example, an unillustrated motor, and the positions thereof in the Z-axis (i.e., the position of the pallet Pin the Z-axis) can be controlled by the local controller of the conveyance device 100.

In the conveyance device 100 described above, the first wheel 42 and the second wheel 52 of the lifting device 30 are arranged so as to roll on the rear surface 22 and the front surface 21 of the support column 20, respectively. Thus, the first wheel 42 and the second wheel 52 are arranged outside of the support column 20, and thus, the structure can be simplified and accessibility to the first wheel 42 and the second wheel 52, for example, during assembly and maintenance can be improved. Thus, a conveyance device having suitable maintainability with a simple structure can be provided.

Furthermore, in the conveyance device 100, the support column 20 is a square column having a front surface 21, a rear surface 22, a right surface 23, and a left surface 24, the upper member 41 has an upper main member 41a which is arranged behind the support column 20 and which supports the first wheel 42, and a pair of upper auxiliary members 41b which protrude forward from the upper main member 41a and which support the pair of third wheels 43, the upper member 41 is open toward the front, the lower member 51 has a lower main member 51a which is arranged in front of the support column 20 and which supports the second wheel 52, and a pair of lower auxiliary members 51b which protrude rearward from the lower main member 51a and which support the pair of fourth wheels 53, the lower member 51 is open toward the rear, and the linking members 60, in a side view, extend diagonally and linearly so as to link the upper main member 41a and the lower main member 51a. Such lifting device 30 has, in a right-side view, as described above, a substantially Z-shaped structure formed by the upper member 41, the linking members 60, and the lower member 51. In this Z-shaped structure, the upper rear upper main member 41a, which supports the first wheel 42, and the lower front lower main member 51a, which supports the second wheel 52, are diagonally and linearly linked by the linking members 60, and thus, the weight of the loading platform 90 and the workpiece W can be transmitted to the upper rear first wheel 42 by the shortest distance. Thus, the force can be efficiently dispersed in the front and rear. Furthermore, stability in the left-right directions can be improved by the third and fourth wheels 43, 53. As described above, the Z-shaped structure of the lifting device 30 can efficiently achieve both the distribution of the force in the front-rear directions and stability in the left-right directions.

Furthermore, in the conveyance device 100, the lifting device 30 is driven by the gear G which is rotated by the motor M affixed to the lifting device 30 and the linear guide member L which is affixed to the rear surface 22 of the support column 20 and which meshes with the gear G. Since the linear guide member L is affixed to the rear surface 22 of the support column 20, a structure which is compact as compared with, for example, a lifting device which is driven using a moving member such as a chain can be obtained.

Furthermore, the conveyance device 100 comprises a safety device 35 which detects inclination of the lifting device 30 when an upward force is exerted on the loading platform 90. In the conveyance device 100, as described above, when an upward force is exerted on the loading platform 90, due to the Z-shaped structure, a moment is generated in the direction in which the first wheel 42 and the second wheel 52 are separated from the support column 20. Thus, by detecting inclination of the lifting device 30 due to such a moment, safety can be improved.

Furthermore, the conveyance device 100 comprises a first adjustment mechanism 70A for adjusting the position of the first wheel 42 with respect to the upper member 41 and a second adjustment mechanism 70B for adjusting the position of the second wheel 52 with respect to the lower member 51. The first wheel 42 and the second wheel 52 may wear with use. When the first wheel 42 and the second wheel 52 become worn, the posture of the lifting device 30 with respect to the support column 20 changes, which may cause the lifting device 30 to incline. In order to maintain a constant posture of the lifting device 30 with respect to the support column 20, it is necessary to adjust at least one of the position of the first wheel 42 with respect to the upper member 41 and the position of the second wheel 52 with respect to the lower member 51, and in the conveyance device 100, these can be adjusted by the first adjustment mechanism 70A and the second adjustment mechanism 70B. Thus, a constant posture of the lifting device 30 with respect to the support column 20 can be maintained over the long term.

Furthermore, the conveyance device 100 comprises a reinforcing member 11 which links the carriage 10 and the rear surface 22 of the support column 20. In the conveyance device 100, since the lower member 51 of the lifting device 30 opens rearward, even if such a reinforcing member 11 is provided on the rear surface 22 of the support column 20, there is no interference between the lifting device 30 and the reinforcing member 11. Thus, the strength of the conveyance device 100 can be increased.

Though the embodiments of the conveyance device have been described, the present invention is not limited to the embodiments described above. A person skilled in the art would understand that various changes can be made to the embodiments described above.

For example, in the embodiments described above, the conveyance device 100 comprises both the first adjustment mechanism 70A, for adjusting the position of the first wheel 42, and the second adjustment mechanism 70B, for adjusting the position of the second wheel 52. However, in another embodiment, the conveyance device 100 may comprise only one of the first adjustment mechanism 70A and the second adjustment mechanism 70B. With such a configuration, inclination of the lifting device 30 due to wear of the first wheel 42 and the second wheel 52 can be corrected.

DESCRIPTION OF REFERENCE SIGNS

10 Carriage
11 Reinforcing Member
20 Support Column
21 Front Surface of Support Column
22 Rear Surface of Support Column
23 Right Surface of Support Column
24 Left Surface of Support Column
30 Lifting Device
41 Upper Member
42 First Wheel
43 Third Wheel
51 Lower Member
52 Second Wheel
53 Fourth Wheel
60 Linking Member
90 Loading Platform
100 Conveyance Device

The invention claimed is:

1. A conveyance device for carrying a product, the conveyance device comprising:
(i) a carriage which travels in horizontal forward and rearward directions,
(ii) a support column which protrudes upwardly from the carriage,
(iii) a lifting device which moves in the upward and downward directions along the support column, comprising:
an upper guide having a first wheel which rolls on a rear surface of the support column and an upper member having an upper main member which is arranged behind the support column and configured to support the first wheel,
a lower guide, arranged below the upper guide, having a second wheel which rolls on a front surface of the support column and a lower member which supports the second wheel, and
a linking member which links the upper member and the lower member to each other, and
(iv) a loading platform which is moved in the upward and downward direction by the lifting device, which is arranged in front of the second wheel, and which is linked to a front side of the linking member, wherein
the lower guide has a pair of fourth wheels which roll on the left and right surfaces of the support column,
the lower member comprises:
a lower main member which is arranged in front of the support column and which supports the second wheel, and
a pair of lower auxiliary members which protrude rearwardly from the lower main member so as to face each other with the support column interposed therebetween, and which support the pair of fourth wheels,
the lower member is open toward the rear, and
the linking member, in a side view, extends diagonally and linearly so as to link the upper main member and the lower main member.

2. The conveyance device according to claim 1, wherein the support column is a square column having the front surface, the rear surface, and the left and right surfaces, the upper guide has a pair of third wheels which roll on the left and right surfaces of the support column, the upper member comprises:
a pair of upper auxiliary members which protrude forwardly from the upper main member so as to face each other with the support column interposed therebetween, and which support the pair of third wheels,
the upper member is open toward the front.

3. The conveyance device according to claim 2, further comprising a reinforcing member which links the carriage and the rear surface of the support column.

4. The conveyance device according to claim 1, wherein the lifting device is driven by a gear which is rotated by a motor affixed to the lifting device and a linear guide member which is affixed to the rear surface of the support column and which meshes with the gear.

5. The conveyance device according to claim 1, further comprising a safety device which detects inclination of the lifting device when an upward force is exerted on the loading platform.

6. The conveyance device according to claim 1, further comprising an adjustment mechanism for adjusting at least one of a position of the first wheel with respect to the upper member and a position of the second wheel with respect to the lower member.

* * * * *